United States Patent [19]

Smits et al.

[11] Patent Number: 5,484,858

[45] Date of Patent: Jan. 16, 1996

[54] POLYMER MIXTURE WHICH COMPRISES A POLYPHENYLENE ETHER AND A POLYAMIDE

[75] Inventors: Hendrikus J. E. Smits, Roosendaal; Roelof van der Meer, Halsteren, both of Netherlands; Adelbert H. L. Groothuis, Evansville, Ind.

[73] Assignee: General Electric Company, Pittsfield, Mass.

[21] Appl. No.: 325,658

[22] Filed: Oct. 18, 1994

Related U.S. Application Data

[62] Division of Ser. No. 436,583, Nov. 15, 1989, Pat. No. 5,357,003.

[30] Foreign Application Priority Data

Nov. 16, 1988 [NL] Netherlands ............... 8802819
Jul. 25, 1989 [NL] Netherlands ............... 8901916

[51] Int. Cl.⁶ ............... C08L 71/12; C08L 77/06; C08L 83/04
[52] U.S. Cl. ............... 525/393; 525/66; 525/68; 525/92 B; 525/92 D; 525/105; 525/106; 525/397; 524/265; 524/267; 524/423
[58] Field of Search ............... 525/66, 68, 92, 525/105, 106, 393, 397; 524/265, 267, 423

[56] References Cited

U.S. PATENT DOCUMENTS

| | | | |
|---|---|---|---|
| 3,063,872 | 11/1962 | Boldebuck | 430/296 |
| 3,379,792 | 4/1968 | Finholt | 525/397 |
| 3,737,479 | 6/1973 | Haaf | 525/393 |
| 3,960,985 | 6/1976 | Cooper | 525/393 |
| 4,338,421 | 7/1982 | Maruyama et al. | 525/397 |
| 4,446,090 | 5/1984 | Lovgren et al. | 264/211 |
| 4,487,858 | 12/1984 | Lovgren et al. | 523/348 |
| 4,737,938 | 3/1988 | Grant et al. | 525/92 |
| 4,749,737 | 6/1988 | van der Meer | 524/267 |
| 4,787,991 | 11/1988 | Morozumi et al. | 252/12.4 |
| 4,871,795 | 10/1989 | Pawar | 524/267 |
| 5,032,635 | 7/1991 | Avakian et al. | 524/262 |
| 5,061,746 | 10/1991 | Gallucci et al. | 524/188 |

FOREIGN PATENT DOCUMENTS

| | | |
|---|---|---|
| 207152k | 5/1975 | Czechoslovakia . |
| 0182163 | 5/1986 | European Pat. Off. . |
| 3202652 | 8/1988 | Japan . |
| 2035337 | 6/1980 | United Kingdom . |

*Primary Examiner*—Thomas Hamilton, III

[57] ABSTRACT

The properties of polyphenylene ether-polyamide mixtures can be improved by the addition of polysiloxane compounds.

15 Claims, No Drawings

POLYMER MIXTURE WHICH COMPRISES A POLYPHENYLENE ETHER AND A POLYAMIDE

This is a divisional of application Ser. No. 07/436,583 filed on Nov. 15, 1989, now U.S. Pat. No. 5,357,003.

BACKGROUND OF THE INVENTION

1. Field of the Invention

The invention relates to a polymer mixture which comprises a polyphenylene ether, a polyamide, and an agent to improve the flame-retarding properties.

2. Description of the Related Art

Polymer mixtures which comprise a polyphenylene ether and a polyamide are known from many patent publications. Most of the patent publications provide the possibility of giving the polymer mixtures flame-retarding properties by the addition of flame-retardants.

SUMMARY OF THE INVENTION

Many agents are known to improve the flame-retarding properties of synthetic resins. Polysiloxanes have also been proposed for this purpose. A deterioration of the mechanical properties, for example, the impact strength, often occurs by the addition of flame-retardants.

The invention is based on the discovery that, by the use of polysiloxanes in polyphenylene ether-polyamide mixtures an improvement is obtained not only of the flame-retarding properties but also of the mechalical properties, in particular of the impact strength.

It has been found that the addition of polysiloxanes, even in concentrations of two to ten percent by weight, does not, or does not in most of the cases, lead to delamination.

The polymer mixture according to the invention is characterised in that the polysiloxane compound is used as an agent to improve the flame-retarding properties.

As a polysiloxane compound may be used a compound which comprises one or more groups (moieties) which can react with a carboxyl group and/or an amine group and/or which comprises one or more aromatic side groups. The use of such polysiloxanes sometimes leads to a further improvement of the mechanical properties.

The polysiloxane compound preferably comprises one or more of the following groups: an amine group, an epoxy group or a group derived from a carboxylic acid.

Preferred polysiloxane compounds are those of formula Ia or Ib: t,0230
wherein m+n has a value of 5–2,000, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, each independently of each other, represent a hydrogen atom or one of the following groups having 1–12 carbon atoms; alkyl, alkoxy, alkenyl, aryl, aralkyl, alkylaryl, which groups may be halogenated; wherein $X_1$, $X_2$, $X_3$, each independently of each other, are one of the following groups: alkylene, cycloalkylene, arylene, aralkylene, alkylarylene; wherein $Z_1$, $Z_2$, $Z_3$ each represent one of the following groups: —$NR_{16}R_{17}$, —NH—$(CH_2)_k$—$NR_{16}R_{17}$, in which $R_{16}$ and $R_{17}$, each independently of each other, represent a hydrogen atom or an alkyl group having 1–12 carbon atoms, k has a value from 1–10, an aliphatic or cycloaliphatic epoxide, a carboxylic acid group, $Z_1$ or $Z_2$ a hydrogen atom, in which, however, the compound of formula Ia may not comprise simultaneously an amine group and an epoxide group, or not simultaneously an amine group and a carboxylic acid group, or not simultaneously an epoxide group and a carboxylic acid group.

The flame-retarding properties can be further improved by the addition of an inorganic material, for example, barium sulphate or titanium dioxide.

The polymer mixture according to the invention preferably comprises 0.1–15 parts by weight of the flame-retardant per 100 parts by weight of polyphenylene ether plus polyamide.

It is to be preferred to add to the polymer mixture according to the invention one of the known agents to improve the compatibility and/or the properties of polyphenylene ether-polyamide mixtures.

The polymer mixture according to the invention may comprise an agent to improve the impact strength, preferably in a quantity of 1–20 parts by weight of polyphenylene ether plus polyamide.

Various polyamides are commercially available. Polyamides having a comparatively low content of terminal amine groups and a comparatively high content of terminal acid groups, and conversely. When using a polysiloxane compound having one or more amine groups or epoxy groups, a polyamide having a comparatively high content of terminal acid groups is preferably used. When using a polysiloxane compound having one or more groups derived from a carboxylic acid, a polyamide having a comparatively high content of terminal amine groups is preferably used.

The polymer mixture according to the invention preferably comprises a functionalised polyphenylene ether i.e. polyphenylene ether having reactive, usually acid, groups as an agent to improve the compatibility.

The invention also relates to articles formed from the polymer mixture according to the invention.

DESCRIPTION OF THE PREFERRED EMBODIMENTS

The polymer mixture according to the invention comprises at any rate the following constituents:

A. a polyphenylene ether
B. a polyamide
C. a polysiloxane.

A. Polyphenylene Ether

Polyphenylene ethers are compounds known per se. For this purpose reference may be made to the U.S. Pat. Nos. 3,306,874; 3,306,875; 3,257,357 and 3,257,358. Polyphenylene ethers are usually prepared by an oxidative coupling reaction—in the presence of a copper amine complex—of one or more twofold or threefold substituted phenols, homopolymers and copolymers, respectively, being obtained. Copper amine complexes derived from primary and/or secondary and/or tertiary amines may be used. Examples of suitable polyphenylene ethers are:
poly(2,3-dimethyl-6-ethylphenylene-1,4-ether)
poly(2,3,6-trimethylphenylene-1,4-ether)
poly[2-(4'-methylphenyl)phenylene-1,4-ether]
poly(2-bromo-6-phenylphenylene-1,4-ether)
poly(2-methyl-6-phenylphenylene-1,4-ether)
poly(2-phenylphenylene-1,4-ether)
poly(2-chlorophenylene-1,4-ether)
poly(2-methylphenylene-1,4-ether)
poly(2-chloro-6-ethylphenylene-1,4-ether)
poly(2-chloro-6-bromophenylene-1,4-ether)
poly(2,6-di-n-propylphenylene-1,4-ether)
poly(2-methyl-6-isopropylphenylene-1,4-ether)
poly(2-chloro-6-methylphenylene-1,4-ether)

poly(2-methyl-6-ethylphenylene-1,4-ether)
poly(2,6-dibromophenylene-1,4-ether)
poly(2,6-dichlorophenylene-1,4-ether)
poly(2,6-diethylphenylene-1,4-ether)
poly(2,6-dimethylphenylene-1,4-ether), Copolymers for example, copolymers derived from two or more phenols as used in the preparation of the homopolymers mentioned hereinbefore, are also suitable. Furthermore, graft copolymers and block copolymers of vinylaromatic compounds, for example, polystyrene and of polyphenylene ether as described hereinbefore are also suitable.

Polyphenylene ethers which may be used in the invention are also those which comprise molecules having at least one of the terminal groups of formulae II and III: t,0240 in which each $Q^1$ individually represents a halogen, a primary or secondary lower alkyl (that is to say an alkyl having 1–7 carbon atoms), phenyl, haloalkyl, aminoalkyl, hydrocarbonoxy or halohydrocarbonoxy, in which at least two carbon atoms separate the halogen and oxygen atoms and each $Q^2$ individually represents a hydrogen, a halogen, primary or secondary lower alkyl, phenyl, haloalkyl, hydrocarbonoxy or halohydrocarbonoxy as defined for $Q^1$; in which each $R^1$ individually represents hydrogen or alkyl, in which the overall number of carbon atoms in both $R^1$ radicals is 6 or less; and each $R^2$ individually represents hydrogen or a $C_{1-6}$ primary alkyl radical. Each $R^1$ preferably is hydrogen and each $R^2$ alkyl, in particular methyl or n-butyl.

Polymers having terminal groups of formula II (hereinafter "aminoalkyl terminal groups") may be formed by the incorporation of a suitable primary or secondary monoamine as one of the constituents of the oxidative coupling reaction mixture, in particular when a catalyst comprising copper or manganese is used. Such amines, in particular the dialkylamines, and preferably di-n-butylamine and dimethylamine, are regularly bonded chemically to the polyphenylene ether, in most of the cases by replacing one of the alpha-hydrogen atoms on one or more $Q^1$ radicals. The major reaction site is the $Q^1$ radical situated beside the hydroxy group on the terminal unit of the polymer chain. During the further processing and/or mixing the aminoalkyl terminal groups may experience various reactions, in which probably a quinone methide type intermediate product of formula IV: t,0250 plays a role, in which numerous favourable effects occur often including an increase of the impact strength and a compatibilisation with other constituents in a mixture.

For this purpose reference may be made to the U.S. Pat. Nos. 4,054,553; 4,092,294; 4,477,649; 4,477,651 and 4,517,341, the contents of which are incorporated herein by reference.

Polymers having 4-hydroxybiphenyl terminal groups of formula III are usually obtained from reaction mixtures in which a by-product diphenone quinone of formula V: t,0251 is present, in particular in a copper halide secondary or tertiary amine system. In this respect the contents of U.S. Pat. No. 4,477,649 are of importance, as well as those of the U.S. Pat. Nos. 4,234,706 and 4,482,697 which are also incorporated herein by reference. In mixtures of this type the diphenone quinone is ultimately incorporated in the polymer in comparatively large quantities, for the greater part as a terminal group.

In many polyphenylene ethers which are obtained in the circumstances mentioned hereinbefore, a large part of the polymer molecules, for example, approximately 90% by weight of the polymer, comprises terminal groups of one or sometimes both of the formulae II and III. It will be obvious that other terminal groups may also be present and that the present invention in its broadest form does not depend on the molecular structure of the polyphenylene ether terminal groups.

B. Polyamide

The polymer mixtures according to the invention comprise a polyamide. Any thermoplastic polyamide known per se may be used in the polymer mixtures according to the invention. Suitable polyamides are, for example, polyamide-4, polyamide-6, polyamide-4,6, polyamide-6,6, polyamide-3,4, polyamide-12, polyamide-11, polyamide-6,10, polyamides prepared from terephthalic acid and 4,4'-diaminodicyclohexyl methane, polyamides prepared from azelaic acid, adipic acid and 2,2-bis-(p-aminocyclohexyl) propane, polyamides prepared from adipic acid and metaxylylene diamine, polyamides from terephthalic acid and trimethyl-hexamethylene diamine.

It is also possible to use a mixture of two or more polyamides. It is further possible to use copolymers, for example, copolymers of polyamide-6 and polyamide-6,6. Polyamides having a comparatively low content of terminal amine groups and a comparatively high content of terminal acid groups are preferably used.

C. Polysiloxane

Polysiloxanes are compounds known per se. Their properties vary from a comparatively low viscous liquid to rubber-like polymers. Polysiloxanes usually consist of a main chain of alternating silicon atoms and oxygen atoms, substituted with various groups at the silicon atom. The polysiloxane compounds may have different structures: homopolymer, block copolymer or random copolymer. Suitable polysiloxanes are liquids in which the substituents at the silicon atoms mainly consist of alkyl groups, for example, methyl groups or phenyl groups, or aryl groups, for example, phenyl groups, or a combination of the two. It is also possible that a part of the silicon atoms is bonded to a hydrogen atom.

It is possible to use polysiloxanes which comprise one or more groups (moieties) which are capable of reacting with a carboxyl group and/or an amine group. Examples of such groups are: amine groups, epoxy groups and groups derived from carboxylic acids.

It is sometimes to be preferred to use a polysiloxane compound of formula Ia or Ib, wherein m+n has a value of 5–2,000, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, and $R_{15}$, each independently of each other, represent a hydrogen atom or one of the following groups having 1–12 carbon atoms: alkyl, alkoxy, alkenyl, aryl, aralkyl, alkylaryl, which groups may be halogenated; wherein $X_1$, $X_2$, $X_3$, each independently of each other, represent one of the following groups: alkylene, cycloalkylene, arylene, aralkylene, alkylarylene; wherein $Z_1$, $Z_2$, $Z_3$ each represent one of the following groups: $-NR_{16}R_{17}$, $-NH-(CH_2)_k-NR_{16}R_{17}$ in which $R_{16}$ and $R_{17}$, each independently of each other, represent a hydrogen atom or an alkyl group having 1–12 carbon atoms, k has a value from 1–10, an aliphatic or cycloaliphatic epoxide, a carboxylic acid group, $Z_1$ or $Z_2$ is a hydrogen atom, in which, however, the compound of formula Ia may not comprise simultaneously an amine group and an epoxide group, or not simultaneously an amine group and a carboxylic acid group, or not simultaneously an epoxide group and a carboxylic acid group. Suitable carboxylic acid groups are acid anhydride groups.

In addition to the constituents mentioned hereinbefore the polymer mixture according to the invention may comprise any constituents known for polyphenylene ether-polyamide mixtures. The polymer mixture according to the invention preferably comprises also one or more of the following constituents:

D. an agent to improve the compatibility

E. an agent to improve the impact strength.

D. Agent to Improve the Compatibility

It is known that polyphenylene ethers and polyamides are not fully miscible. In order to improve the mutual miscibility and hence the properties of the mixtures, a large number of different agents have meanwhile been suggested to improve the compatibility. A survey thereof is to be found in EP-A-0236593. All these agents are suitable for use in the polymer mixture according to the invention. They are in particular the following agents:

I) liquid diene polymers or epoxy compunds or compounds having in their molecular structure a twofold or threefold carbon-to-carbon bond and a carboxylic acid, acid anhydride, acid amide, imido, carboxylic acid ester, amino or hydroxyl group in a quantity from 0.01 to 30 parts by weight per 100 parts by weight of polyarylene sulphide plus polyphenylene ether, II) aliphatic polycarboxylic acids or derivatives thereof of the general formula:

$(R_1O)_mR(COOR_2)_2CONR_3R_4)_s,$ wherein R is a saturated hydrocarbon group having 2 to 20 carbon atoms with a linear or branched chain; $R_1$ is a hydrogen atom or an alkyl group, aryl group, acyl group or carboxyldioxy group having 1 to 10 carbon atoms; each $R_2$, independently of each other, represents a hydrogen atom or an alkyl group or aryl group having 1 to 20 carbon atoms; each $R_3$ and $R_4$ independently of each other represents a hydrogen atom or an alkyl group or aryl group having 1 to 10 carbon atoms; m is equal to 1 and (n+s) is larger than or equal to 2 and n and s are each larger than or equal to zero; and wherein $(OR_1)$ is in an alpha position or beta position with respect to a carbonyl group and in which at least two carbonyl groups are separated by 2 to 6 carbon atoms, in a quantity from 0.05 to 5 parts by weight per 100 parts by weight of polyarylene sulphide plus polyphenylene ether, III) a silane compound having in its molecular structure (a) at least one silicon atom which is bonded via an oxygen bridge to a carbon atom, and (b) at least one ethenic carbon-to-carbon double bond or one carbon-to-carbon triple bond and/or one functional group selected from an amine group and a mercapto group, in which the functional group is not bonded directly to the silicon atom, in a quantity from 0.05 to 4 parts by weight of polyarylene sulphide plus polyphenylene ether, IV) a functionalised polyphenylene ether consisting of the reaction product of (a) a polyphenylene ether and (b) a compound of the general formula (a)—Z—(ii), in which (i) is at least a group of the formula [X—C(O)] with X=F, Cl, Br, I, OH —OR, or —O—C(O)R with R=H, alkyl or aryl, in which (ii) is at least a carboxylic acid, acid anhydride, acid amide, imido, carboxylic acid ester, amino or hydroxyl group and in which the groups (i) and (ii) are covalently bonded together via a bridge Z, Z being a bivalent hydrocarbon radical, V) a copolymer having units of a vinylaromatic compound and of an alpha-beta unsaturated dicarboxylic acid or dicarboxylic acid anhydride or a copolymer having units of a vinylaromatic compound and of an imide compound of an alpha-beta unsaturated dicarboxylic acid in a quantity from 0.5 to 100 parts by weight per 100 parts by weight of polyarylene sulphide plus polyphenylene ether, VI) the reaction product of a) a 1,2-substituted olefinic compound with carboxyl group or acid anhydride group, b) a polyphenylene ether and c) a radical initiator, in a quantity from 0.5 to 150 parts by weight per 100 parts by weight of polyarylene sulphide plus polyphenylene ether.

The above-described agents are described more elaborately in EP-A-0236593 and in the literature references mentioned therein.

The agents mentioned sub IV) and VI) may fully or partly replace the polyphenylene ether in the polymer mixtures according to the invention.

The following agents are to be considered in addition to those mentioned hereinbefore.

VII) the reaction product of one of the agents mentioned sub I) with a polyphenylene ether. This reaction product me be formed in situ in the polymer mixture according to the invention when the various constituents in the melt are mixed, for example, in an extruder. It is also possible to form this reaction product individually and to add it subsequently to the remaining constituents of the polymer mixture according to the invention, VIII) styrene copolymers, for example, as described in EP-A-0,237,710; DE-A-3,601,581; EP-A-0,221,341; EP-A-0,222,129 and EP-A-0,184,151. Essentially, the said copolymers are built up from units derived from styrene monomers and from units having reactive groups. According to the patent publications mentioned hereinbefore the said copolymers are added to polyphenylene ether-polyamide mixtures in order to improve the properties thereof. However, this improvement is associated with an improvement of the homogeneity of the polymer mixture, IX) polyphenylene ethers having reactive groups as described in EP-A-0,222,250 and in EP-A-0,226,055. The polyphenylene ethers described have reactive carboxyl groups which are introduced in various manners, X) polyphenylene ethers having a reactive epoxy group. Such polyphenylene ethers may be obtained, for example, by reacting a solution of a polyphenylene ether with an epoxy chlorotriazine.

E. Agent to Improve the Impact Strength

The impact strength of the polymer mixture according to the invention can still be further improved by the addition of one or even two agents to improve the impact strength. For this purpose are to be considered any agents known for polyphenylene ethers and/or polyamides. For this purpose reference may be made, for example, to EP-A-0,236,593.

In addition to the complementary constituents mentioned hereinbefore sub D and E, the polymer mixture according to the invention may comprise one or more of the following constituents: styrene homopolymers or copolymers, high-impact polystyrene, dyes, pigments, reinforcing fibres, for example, glass fibres, fillers and stabilisers.

The polymer mixtures according to the invention can be prepared in various manners: by mixing solutions or slurries of the constituents succeeded by evaporation or also melt extrusion. In general, melt extrusion is preferred. In the melt extrusion process the individual constituents are provided, for example, in an extruder. In the extruder the constituents are heated, usually to a temperature above the melting temperature of the highest-melting-point constituent or one of the highest-melting-point constituents, for example, the polyphenylene ether, and are thoroughly mixed. The so-called extrudate then emanates from the extruder usually in the form of a strand which is chopped up. The resulting pellets of the polymer mixtures according to the invention can be further processed according to techniques known per se for injection-moulding thermoplastic synthetic resins. It has been found in the preparation of the polymer mixtures according to the invention in an extruder that the sequence in which the various constituents are mixed with each other is of importance. For example, polymer mixtures having better mechanical properties are often obtained when the polyphenylene ether or a part of the quantity of polyphenylene ether to be used is premixed in an extruder in a separate step with an agent to improve the compatibility. The pre-extrudate thus obtained is then mixed in an extruder with the remaining constituents.

EXAMPLES I TO IV INCLUSIVE

In these examples the following constituents were used:

| | |
|---|---|
| PPE-PA-1: | a precompounded mixture consisting of 52.5 parts by weight of functionalised poly(2,6-dimethyl-1,4-phenylene)ether, 47.5 parts by weight of polyamide-6 having a comparatively high content of terminal acid groups, and 0.52 parts by weight of stabilisers. This mixture was extruded in an extruder adjusted at an average temperature of 285° C. The functionalised polyphenylene ether used was obtained according to the first-mentioned method of example 1 of WO-A-86/02086, in which, however, 3.5 parts by weight of trimellitic anhydride acid chloride and 3.5 parts by weight of dimethyl-n-butylamine were used per 100 parts by weight of polyphenylene ether. This may be considered as a mixture of a functionalised and a non-functionalised polyphenylene ether. The polyamide-6 has a reduced viscosity of 146 ml/g measured at 25° C. at a solution of the polyamide in 90% formic acid (0.5 g per 100 ml), an acid terminal-group-content of 51 milliequivalents per kg and an amine-terminal-group content of 36 milliequivalents per kg. |
| $BaSO_4$: | barium sulphate. |
| SF-1: | a polysiloxane of formula II, wherein $R_1$, $R_3$ and $R_4$ are a methyl group, $R_2$, $R_5$ and $R_6$ are a methoxy group, $X_1$ is a methylene group, $X_2$ is a propylene group, $Z_1$ is a hydrogen atom and $Z_2$ is a $-NH-(CH_2)_2-NH_2$ group, and $\underline{m}$ has an average value of 1 and $\underline{n}$ has an average value of 14. |
| SF-2: | a poly(dimethyl-diphenyl siloxane) having a nominal viscosity, at 25° C., of 190 centistokes and a ratio of the number of methyl to phenyl groups of approximately 1. |
| SF-3: | a poly(dimethyl-diphenyl siloxane) having a nominal viscosity of 450 centistokes (25° C.) and a ratio of the number of methyl to phenyl groups of approximately 0.4. |
| SF-4: | a poly(dimethyl siloxane) having a nominal viscosity of 12,500 (25° C.). |
| ST: | a mixture of various stabilisers. |

The above-mentioned constituents were compounded in an extruder in the quantities indicated hereinafter in the table. The extruder was adjusted at an average value of 285° C.

The extrudate was chopped up to pellets. Test pieces were injection-moulded from the pellets to determine the notched impact strength, the tensile strength, the flame-retarding properties according to UL94 (thickness test plats 1.6 mm) and the overall extinction time according to UL 94. The tendency to delamination was also evaluated visually.

The found results are also recorded in the Table A hereinafter.

TABLE A

| Example | I | II | III | IV | V |
|---|---|---|---|---|---|
| Composition (parts by weight) | | | | | |
| PPE-PA-1 | 85 | 85 | 85 | 80 | 80 |
| $BaSO_4$ | 10 | 10 | 10 | 10 | 10 |
| SF-1 | 5 | — | — | — | 5 |
| SF-2 | — | 5 | — | — | — |
| SF-3 | — | — | 5 | — | — |
| SF-4 | — | — | — | 10 | 5 |
| ST | 0.52 | 0.52 | 0.52 | 0.52 | 0.52 |
| Properties: | | | | | |
| Izod notch impact value (J/m) | 58 | 55 | 40 | 173 | 220 |
| Tensile strength (MPa) | 66 | 71 | 70 | 57 | 50 |
| Ul-94 flammability rating*) | V-1 | nearly V-1 | V-1 | V-2 | HB |
| total extinction time**) | 137 | 67 | 118 | BD | — |
| tendency to delamination | no | no | no | no | no |

*)HB is the worst evaluation; then comes V-2, V-1, then V-0.
**)BD = burning drips.

| | |
|---|---|
| PPE PA-2: | a precompounded mixture consisting of 50 parts by weight of functionalised poly(2,6-dimethyl-1,4-phenylene)ether, 50 parts by weight of polyamide-6 having a comparatively high content of terminal acid groups and 0.52 parts by weight of stabilisers. The mixture was prepared from the same constituents and in the same manner as described with reference to examples I to V incl. |
| SF-1: | the same compound as used in Example I. |
| ST: | the same mixture of various stabilisers as used in the preceding examples. |
| $BaSO_4$: | barium sulphate. |

The above-mentioned constituents were compounded in an extruder in the quantities stated hereinafter in Table B. The extruder was adjusted at an average value of 285° C.

The extrudate was chopped up to pellets. Test pieces were injection-moulded from the pellets to determine the notched impact value according to Izod (notched impact strength), the tensile strength and the flame-retarding properties according to UL-94 (thickness test plates 1.6 mm) and the overall extinction time according to UL 94.

The found results are also recorded in Table B hereinafter.

TABLE B

| Example | A | VI | VII | VIII | IX | X |
|---|---|---|---|---|---|---|
| Composition (parts by weight) | | | | | | |
| PPE-PA-2 | 100 | 95 | 92.5 | 90.0 | 90 | 85 |
| SF-1 | — | 5 | 7.5 | 10.0 | 5.0 | 5.0 |
| ST | 0.52 | 0.52 | 0.52 | 0.52 | 0.52 | 0.52 |
| $BaSO_4$ | — | — | — | — | 5.0 | 10.0 |
| Properties | | | | | | |
| Izod notched impact value (J/m) | 46.5 | 76 | 97 | 103 | 56 | 47 |
| Tensile strength | 70 | 66 | 64 | 62 | 67 | 67 |

TABLE B-continued

| Example | A | VI | VII | VIII | IX | X |
|---|---|---|---|---|---|---|
| (MPa) | | | | | | |
| UL-94 flammability | HB | V-1 | V-1 | V-2 | almost V-1** | almost V-0** |
| Overall extinction time (sec)*** | — | 93 | 156 | 139 BD | 210 | 102 |

*HB is the worst evaluation; then comes V-2, then V-1, then V-0.
**In the UL-test five samples are tested. In order to obtain the V-0 rating, all the samples must satisfy certain requirements. In the laboratory experiments four out of the five samples satisfied this requirement. The fifth did not.
***BD = burning drips.

We claim:

1. A polymer mixture comprising a polyphenylene ether, a polyamide, a polysiloxane compound and an agent to improve the compatibility of the polyphenylene ether and the polyamide, wherein the polysiloxane comprises one or more groups which are capable of reacting with a carboxyl group, an amine group, or both a carboxyl group and an amine group.

2. A polymer mixture as claimed in claim 1, wherein the polysiloxane compound comprises at least one group selected from the group consisting of an amine group, an epoxy group, and a group derived from a carboxylic acid.

3. A polymer mixture as claimed in claim 1, characterized in that the polymer mixture comprises 0.1–15 parts by weight of the polysiloxane per 100 parts by weight of polyphenylene ether plus polyamide.

4. A polymer mixture as claimed in claim 1 further comprising 1–20 parts by weight of an agent to improve the impact strength per 100 parts by weight of polyphenylene ether plus polyamide.

5. A polymer mixture as claimed in claim 1, wherein the polyamide comprises a comparatively low content of terminal amine groups and a comparatively high content of terminal acid groups.

6. A polymer mixture as claimed in claim 4, wherein the agent to improve compatibility comprises a functionalized polyphenylene ether.

7. A method of preparing the polymer mixture as claimed in claim 1, wherein the polyphenylene ether and the polyamide are first compounded in the melt after which the polysiloxane compound is mixed with the resulting mixture.

8. Articles formed from the polymer mixture as claimed in claim 1.

9. A polymer mixture as claimed in claim 1, wherein the polysiloxane compound is of the formula Ia or Ib,

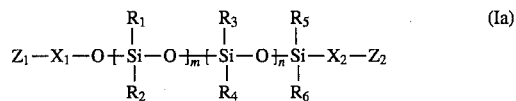

(Ia)

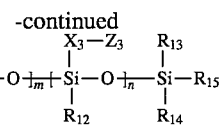

(Ib)

wherein m+n has a value of 5–2000, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, each independently of each other, represent a hydrogen atom or one of the following groups having 1–12 carbon atoms: alkyl, alkoxy, alkenyl, aryl, aralkyl, alkylaryl, which groups may be halogenated; wherein $X_1$, $X_2$, $X_3$, each independently of each other, are one of the following groups: alkylene, cycloalkylene, arylene, aralkylene, alkylarylene; wherein $Z_1$, $Z_2$, $Z_3$ each represent one of the following groups: $-NR_{16}R_{17}$, $-NH-(CH_2)_k-NR_{16}R_{17}$, in which $R_{16}$ and $R_{17}$ each independently of each other, represent a hydrogen atom or an alkyl group having 1–12 carbon atoms, k has a value from 1–10, an aliphatic or cycloaliphatic epoxide, a carboxylic acid group, $Z_1$ or $Z_2$ a hydrogen atom, in which, however, the compound of formulas Ia and Ib may not comprise simultaneously an amine group and an epoxide group, or not simultaneously an amine group and a carboxylic acid group, or not simultaneously an epoxide group and a carboxylic acid group.

10. The polymer mixture of claim 1, further comprising an inorganic material.

11. The polymer mixture of claim 10, wherein the inorganic material is barium sulfate or titanium dioxide.

12. The polymer mixture of claim 1, wherein the polysiloxane compound is present in an amount effective to provide flame retardant properties.

13. The polymer mixture of claim 10, wherein the inorganic material is added in an amount effective to improve the flame retardant properties of the polymer mixture.

14. The polymer mixture of claim 1, wherein the polymer mixture consists essentially of the polyphenylene ether, the polyamide, the polysiloxane compound, and the agent to improve the compatibility of the polyphenylene ether and the polyamide, wherein the polysiloxane comprises one or more groups which are capable of reacting with a carboxyl group, an amine group, or both a carboxyl group and an amine group; and wherein the polysiloxane comprises at least one group which includes at least one aromatic constituent.

15. The polymer mixture of claim 10, wherein the polymer mixture consists essentially of the polyphenylene ether, the polyamide, the polysiloxane compound, the agent to improve the compatibility of the polyphenylene ether and the polyamide, and the inorganic material; wherein the polysiloxane comprises one or more groups which are capable of reacting with a carboxyl group, an amine group, or both a carboxyl group and an amine group; and wherein the polysiloxane comprises at least one group which includes at least one aromatic constituent.

* * * * *